United States Patent [19]

Meyn

[11] Patent Number: 4,586,215
[45] Date of Patent: May 6, 1986

[54] APPARATUS FOR REMOVING THE BREAST FROM THE EVISCERATED CARCASS OF CHICKENS OR THE LIKE

[76] Inventor: Pieter Meyn, Noordeinde 68C, 1511 AE Oostzaan, Netherlands

[21] Appl. No.: 534,984

[22] Filed: Sep. 23, 1983

[30] Foreign Application Priority Data

Sep. 24, 1982 [NL] Netherlands ............. 8203704

[51] Int. Cl.$^4$ ............................................. A22C 21/00
[52] U.S. Cl. ........................................... 17/11; 17/52
[58] Field of Search .................... 17/11, 58, 61, 52

[56] References Cited

U.S. PATENT DOCUMENTS

| | | | |
|---|---|---|---|
| 4,019,223 | 4/1977 | Baker | 17/11 |
| 4,270,243 | 6/1981 | Lewis | 17/11 |

*Primary Examiner*—Willie G. Abercrombie
*Attorney, Agent, or Firm*—Julian W. Dority

[57] ABSTRACT

An apparatus for removing the breast from the eviscerated carcass of a chicken or other bird having an abdominal opening and a neck opening cut therein. The apparatus has a conveyor for advancing the chicken carcasses hanging by the legs thereof in a position with the breast facing forwards and a trough-like guide channel member arranged below the conveyor for supporting and guiding the breast of the carcasses in a substantially horizontal position. A mandrel extends above the guide channel member extending, on the one hand, past the rear end thereof and having, on the other hand, a forward end portion freely extending in the direction facing the advancing carcasses whereby this forward mandrel end is adapted to enter the body cavity of each carcass through the abdominal opening and to leave this cavity through the neck opening of the carcass. Guide means are secured to the lower side of the mandrel extending rearwardly and downwardly past the rear end of the channel member for pressing the chest of each carcass downwardly from the inside thereof as the latter is pulled forwardly on the mandrel. A pair of rotating cutting discs are arranged on both sides of the guide means closely to the mandrel for cutting and removing the breast from each carcass.

12 Claims, 4 Drawing Figures

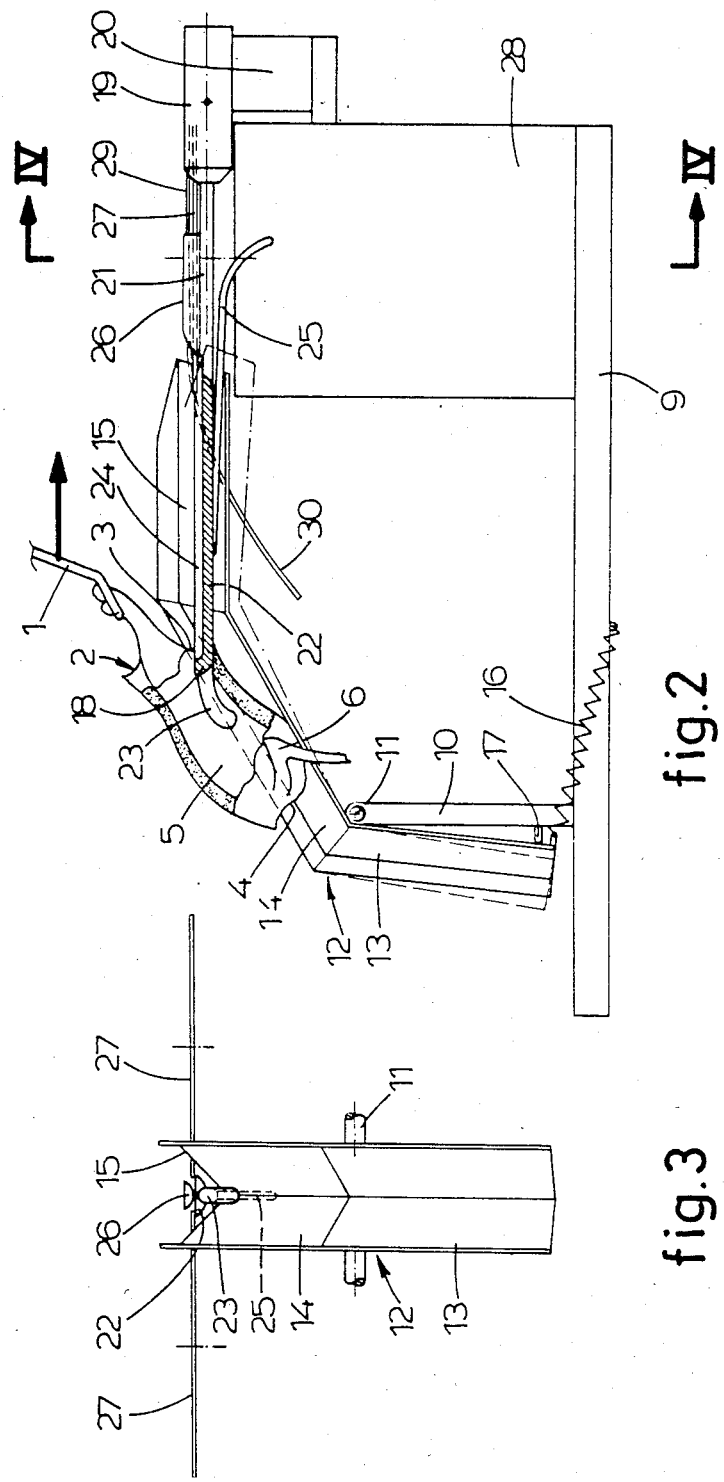

APPARATUS FOR REMOVING THE BREAST FROM THE EVISCERATED CARCASS OF CHICKENS OR THE LIKE

BACKGROUND OF THE INVENTION

The invention relates to an apparatus for removing the breast from the eviscerated carcass of a chicken or other bird.

In the course of the eviscerating process of a chicken carcass normally an abdominal opening and a neck opening are cut in the carcass for the removal of the entrails and other parts, the body cavity thus being accessible through these openings. Generally also the neck and the tail of the bird are removed. In many cases, thereupon the useful component parts of the chicken, such as the wings, legs, and breast components, are removed from the carcass for separate processing and packaging, see for instance U.S. Pat. No. 3,943,600 to Cramer, U.S. Pat. No. 4,270,243 to Lewis and British Pat. No. 1,274,742 to Harvey and Cornford. According to these patents, the processing of the eviscerated carcasses in this manner is carried out by automatic means, requiring substantially no manual handling. Typically the carcasses may be delivered to the infeed end of the apparatus concerned by means of an overhead conveyor which supports the carcasses hanging by the legs and, for instance, in a position with the breast facing forwards.

A problem in an apparatus for automatically removing the breast from the carcasses delivered thereto is that independently of the size of the carcass the meat of the breast should be substantially completely removed therefrom with as little useful meat as possible remaining on the carcass so as to avoid losses.

SUMMARY OF THE INVENTION

It is accordingly a primary object of the invention to provide an apparatus for removing the breast from eviscerated chicken carcasses which allows to completely remove the breast without any substantial loss of meat and without splintering of the bones of the carcass, also if the size of the chickens delivered by the conveyor varies.

A further object of the invention is to provide such an apparatus having novel means for properly positioning carcasses of varying size with respect to the cutting means used for the removal of the breast.

A still further object of the invention is to provide an apparatus of the kind described which operate quickly and efficiently.

The apparatus according to the invention generally comprises means for conveying the chicken carcasses hanging by the legs in a position with the breast facing forwards, and a trough-like guide channel member extending below the conveying means and adapted to support and guide the breast of a carcass advanced by the conveying means in a substantially horizontal position. A mandrel is longitudinally arranged substantially horizontally above the guide channel member, extending past the rear or downstream end of the channel member and having a front or upstream portion freely extending in a direction facing the carcasses advanced by the conveying means. This front portion of the mandrel is adapted to enter the body cavity of the carcass through the abdominal opening and to leave this body cavity through the neck opening cut in the carcass. Guide means are secured to the lower side of the mandrel and extend rearwardly and downwardly past the rear end of the channel member for pressing the chest of the carcass downwardly from the inside thereof as the carcass is pulled forwardly on the mandrel whereby the carcass is firmly held in a proper position to allow a pair of cutting members arranged to the rear of the channel member closely above and on both sides of the mandrel to cut and remove the breast of the carcass.

The chicken carcasses advanced by the conveyor are thus as it were one by one spit on the mandrel in which the breast part of the carcass is first held between the channel member on the outside and the mandrel on the inside thereof whereby the breast part is properly centered and held in the proper lateral position, whereupon on reaching the end of the channel member the downwardly extending guide means presses the breast part downward whereby the carcass is now supported on the mandrel by its spinal column and the breast part is properly stretched to allow the cutting members to separate the breast part from the remaining part of the carcass close to the spinal column. The cut-off breast part drops down whereas the remaining part of the carcass is carried off by the conveyor for further processing.

BRIEF DESCRIPTION OF THE DRAWINGS

The present invention will be more readily understood and the further objects, features and advantages thereof will be more apparent when read in conjunction with the acoompanying drawings, in which

FIG. 2 is a vertical longitudinal section on the line II—II of FIG. 1;

FIG. 3 is a front view of the guide channel member; and

DESCRIPTION OF THE PREFERRED EMBODIMENT

Figure 1:
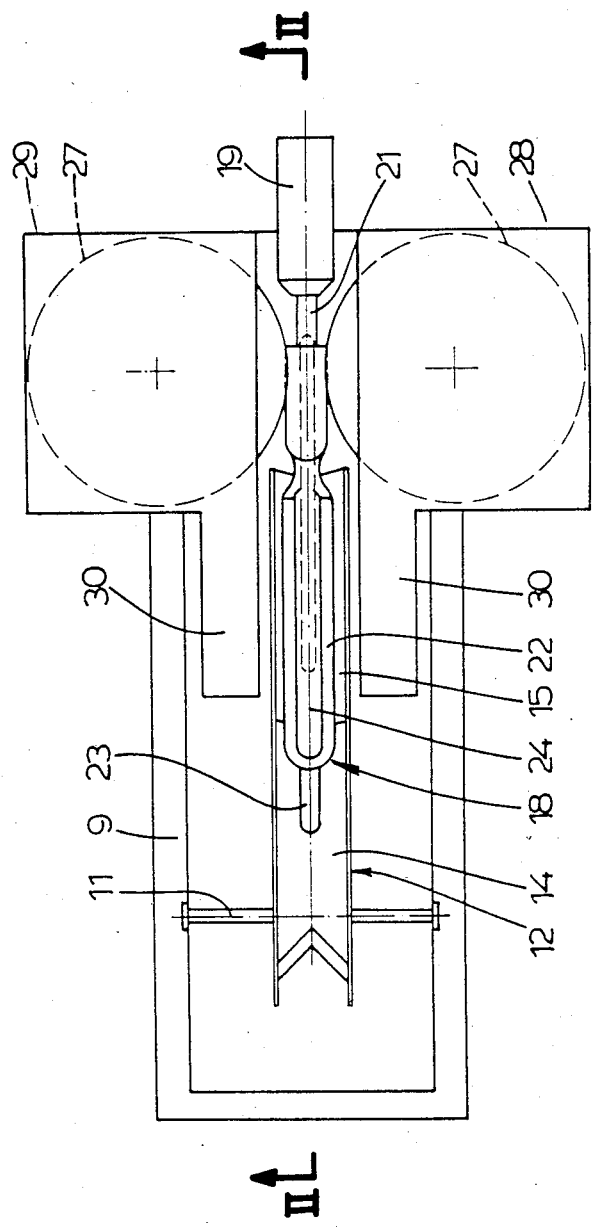
FIG. 1 is a plan view of a preferred embodiment of the apparatus according to the invention.
Figure 4:
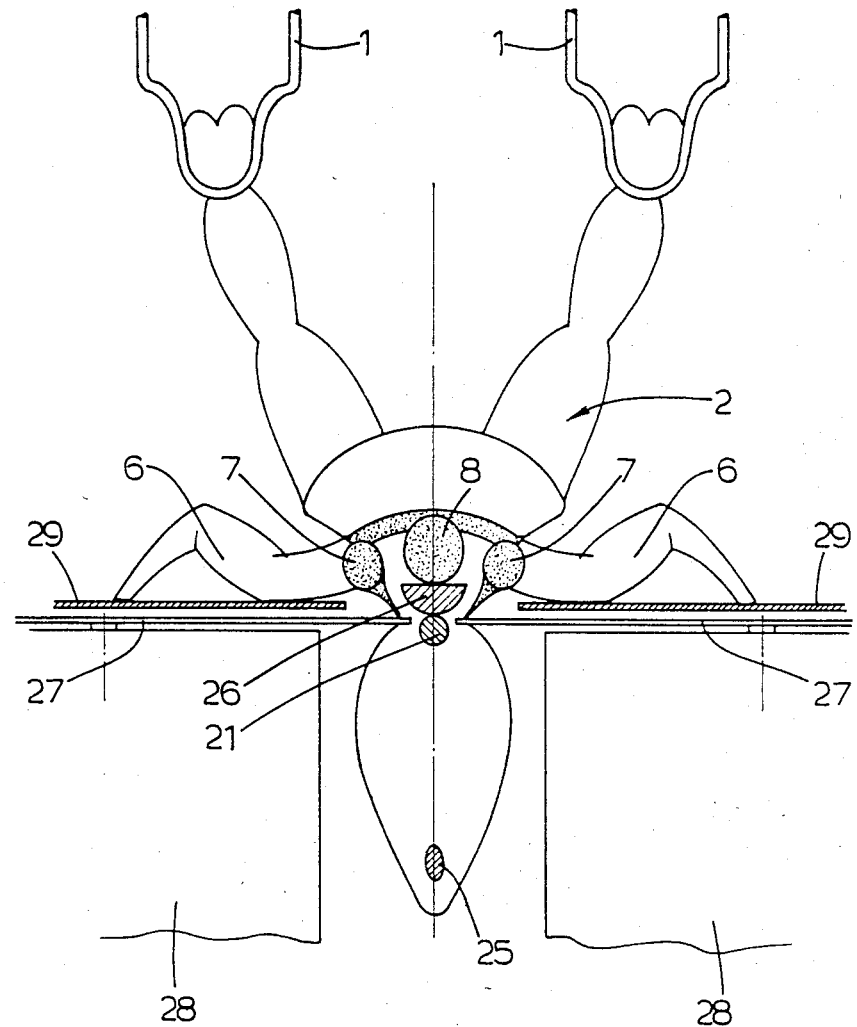
FIG. 4 is an enlarged cross-sectional view on the line IV—IV of FIG. 2 illustrating the operation of the cutting knives during the separation of the breast part of a chicken carcass.

Referring to the drawings, the apparatus there shown for cutting off the breast of eviscerated chicken carcasses is arranged below an overhead conveyor of known design carrying pairs of hooks 1 regularly spaced lengthwise of the conveyor, the hooks 1 of each pair being arranged beside one another in a position in which they can support chicken carcasses 2 by the legs thereof in a position in which the breast of the carcasses faces forwardly in the direction of movement of the conveyor indicated by the arrow in FIG. 2. As further schematically shown in FIG. 2, the chicken carcasses each have an abdominal opening 3 and a neck opening 4 both giving access to the eviscerated body cavity 5 of the carcass. These openings 3 and 4 have been formed in the course of the prior processing of the carcass in the usual manner. FIG. 4 further shows schematically the wings 6 with wing-joints 7 and the spinal column 8 of the bird.

The apparatus as a frame 9 with posts 10 on which a horizontal transverse shaft 11 is pivotally mounted. Secured to this shaft 11 is a trough-like guide channel member 12 having a lower channel part 13 extending downwardly from the shaft 11 and a middle channel part 14 connected to the lower part 13 and extending upwardly from the shaft 11 at an oblique angle, which middle channel part 14 continues in a rear channel part 15 extending substantially horizontally below the conveyor in the direction of movement thereof. A drawspring 16 acts on the lower end of the channel member 12 tending to move the latter against a stop 17 defining the rest position of the channel member shown with full lines in FIG. 2. The rearwardly extending channel part 15 can thus be moved from its horizontal rest position toward a lower position, shown with dotted lines in FIG. 2, against the action of the spring 16. The channel parts 13, 14 and 15 have a V-shaped cross-section (see FIG. 3) with vertical side flanges. The guide channel member 12 has been arranged at such a level below the conveyor hooks 1 that a chicken carcass 2 delivered by the conveyor to the apparatus first strikes the lower channel part 13 and is centered therein, next slides upwardly through the oblique channel part 14 and finally is pulled through the channel part 15 in a substantially horizontal position with its breast part sliding on the bottom of this channel part.

A mandrel generally indicated by 18 extends through the rear channel part 15 in a horizontal direction and spaced from the channel bottom, the rear end of this mandrel being fixedly mounted in a holder 19. The holder 19 is longitudinally adjustably mounted in a support 20 secured to the frame 9 by any conventional longitudinal adjustment means 19a. The mandrel 18 has a rod-like mandrel part 21 of circular cross-section, a middle body part 22 of greater width than the part 21 extending through the horizontal channel part 15 from the rear end thereof and projecting at the opposite side of this channel part 15 for some distance above the oblique middle channel part 14, and a rod-like forward portion 23 of smaller width and having a downward bend with a rounded end. The middle body part 22 of the mandrel is provided on its upper side with a longitudinally extending groove 24.

A guide rod 25 is secured by welding to the lower side of the body part 22 of the mandrel which guide rod projects past the rear end of the rear channel part 15 sloping downward at a small angle and terminating in a downward bend.

An elongate supporting block 26 is secured on the upper side of the mandrel part 21 to the rear of the channel part 15 and above the terminal bend of the guide rod 25. As shown in FIG. 2, this supporting block has a chamfered forward end, a board flat upper side and a substantially half-circular lower face curving upwardly on both sides of the area where the block 26 is secured to the mandrel part 21 (see FIG. 4).

Two rotating cutting discs 27 are arranged at both sides of the supporting block 26 extending close to or to a position just below the block 26. The cutting discs 27 are rotated by suitable drive means not shown arranged in boxes 28 supported on the frame 9. Cover plates 29 extend horizontally closely above the cutting discs 27 leaving the inner disc parts adjacent the supporting block 26 freely accessible and having extensions on both sides of the channel member part 15 forming guide plates 30 extending upwardly in the forward direction of the conveyor from a position well below the channel part 15 to the level of the cover plates 29. These guide plates 30 serve to lift the hanging wings 6 of the advancing birds to the level of the cover plates 29 and thus out of the reach of the cutting discs 27 (FIG. 4).

The apparatus operates as follows:

A chicken carcass delivered to the apparatus by the conveyor on reaching the guide channel member 12 is guided by the channel parts 13 and 14 to the substantially horizontally extending upper channel part 15 in a manner as above described in which the forward mandrel portion 23 with its rounded end enters the abdominal cavity of the carcass and again leaves this cavity through the neck opening 4 whereby the breast part of the carcass is confined between the bottom of the channel part 15 and the broad mandrel body 22. Depending on the size of the chicken carcass the channel part 15 cna give way by moving downwardly against the action of the spring 16. The spinal column 8 of the carcass can find a guideway in the longitudinal groove 24 of the mandrel 18 whereby the carcass is held properly centered. When the carcass leaves the channel member part 15 the breast is pressed downwards from the inside of the carcass by the downwardly extending guide rod 25 and is thus stretched whereby the path for the cutting discs is made free to cut off the breast part of the carcass at the highest possible level, i.e. as close as possible to the spine 8. However, because of this downward stretching of the breast part also the wing joints 7 are pulled towards the cutting discs which would prevent a proper cut. The raised supporting block 26 counteracts this undesirable effect by lifting the wing joints 7 to a level above the cutting discs 29 whereby it is possible to make the cut at the desired position between the wings and the os coracoidum. In this way it is possible to remove the breast completely with a minimum loss of meat.

The removed breast drops down between the boxes 28 to be moved away by means not shown whereas the remaining part of the chicken carcass is taken along by the conveyor for further processing.

If desired it is possible to make the guide rod 25 of resilient material or to pivotally mount this guide rod under the biasing pressure of spring means allowing the end of the rod 25 whne engaging the breast of the carcass from the inside to yield to some extent in order to allow a further adaption to the size of the bird.

While the invention has been illustrated and described with reference to a specific embodiment thereof, it will be understood that other embodiments may be resorted to within the scope of the following claims.

What is claimed is:

1. An apparatus for removing the breast from the eviscerated carcass of a chicken or other bird having an abdominal opening and a neck opening cut therein, comprising
    means for conveying the carcass hanging by the legs in a position with the breast part thereof facing forwards,
    a trough-like guide channel member extending below said conveying means for supporting and guiding the breast of an advancing carcass in a substantially horizontal position,
    a mandrel longitudinally arranged substantially horizontally above said guide channel member and extending past the rear end of said channel member, said mandrel having a forward portion freely extending in a direction facing the carcasses advanced by the conveying means and adapted to enter the body cavity through the abdominal opening and to leave said cavity through said neck opening of the carcass, guide means secured to the lower side of said mandrel and extending rearwardly and downwardly past the rear end of said channel member for pressing the chest of a carcass downwardly from the inside thereof as the latter is pulled forwardly on said mandrel by said conveying means, and a pair of cutting members arranged to the rear of said channel member closely to and on both sides of said mandrel for cutting and removing the breast from the carcass.

2. The apparatus of claim 1 in which said guide channel member comprises a first part sloping upwardly and rearwardly in the direction of movement of said conveying means, and a second part immediately following said first part and extending substantially horizontally in said direction of conveying movement.

3. The apparatus of claim 2 in which said guide channel member is pivotally mounted in said first part thereof, spring means acting on said channel member tending to rotate said member in a direction in which said second member part moves upwardly, stop means being provided on said channel member to hold the latter in a rest position in which said second channel member part has a substantially horizontal position.

4. The apparatus of claim 1 in which said guide channel member has a substantially V-shaped cross-sectional form.

5. The apparatus of claim 2 in which said forward portion of said mandrel projects above said sloping first part of said guide channel member.

6. The apparatus of claim 1 in which said forward portion of said mandrel curves slightly downwards and has a rounded forward end.

7. The apparatus of claim 1 in which said mandrel comprises a body portion of increased width and a longitudinally extending groove formed in the upper side of said body portion for guiding and centering the spinal column of the carcasses.

8. The apparatus of claim 6 in which said body part of said mandrel extends rearwardly substantially up to the rear end of said guide channel member, said mandrel having a rod-like mandrel part of smaller width extending rearwardly from said body part and having a rear end, means being provided to fixedly support said mandrel rear end.

9. The apparatus of claim 7 further comprising an elongate supporting block member secured to the upper side of said rod-like mandrel part between said two cutting members, said supporting block having a chamfered forward end facing the carcasses advanced by said conveying means and serving to lift the wing joints of said carcasses to a level above said cutting members.

10. The apparatus of claim 8 in which said supporting block member has a greater width than said rod-like mandrel part, said block member having a lower side extending upwardly and laterally outwardly on both sides of and away from said rod-like mandrel part, said cutting members projecting inwardly to a position substantially below the lower side of said supporting block member.

11. The apparatus of claim 1 further comprising upwardly inclined guide plates arranged on both sides of said guide channel member for lifting the wings of the advancing carcasses, and horizontally extending cover plates arranged closely above said cutting members, said inclined guide plates leading to said cover plates.

12. The apparatus of claim 1 in which said guide means secured to said mandrel comprises a resilient rod member.

* * * * *